(12) United States Patent
Lee

(10) Patent No.: US 7,011,261 B2
(45) Date of Patent: Mar. 14, 2006

(54) CUTTING TOOL OF A CUTTING MACHINE USED FOR CUTTING PLASTIC MATERIALS INTO GRANULES

(75) Inventor: Chin-Yu Lee, Tainan (TW)

(73) Assignee: Chen Yu Machinery Industry Co., Ltd., Tainan (TW)

( * ) Notice: Subject to any disclaimer, the term of this patent is extended or adjusted under 35 U.S.C. 154(b) by 0 days.

(21) Appl. No.: 10/894,001

(22) Filed: Jul. 20, 2004

(65) Prior Publication Data

US 2006/0016923 A1    Jan. 26, 2006

(51) Int. Cl.
*B02C 1/10* (2006.01)
*B27C 1/00* (2006.01)

(52) U.S. Cl. ............... 241/294; 241/293; 144/176; 407/41; 407/47

(58) Field of Classification Search ............... 241/293, 241/294; 144/230, 176; 407/40, 41, 47, 407/49

See application file for complete search history.

(56) References Cited

U.S. PATENT DOCUMENTS

| 1,838,875 A | * | 12/1931 | Shartle ............... 241/294 |
| 2,862,424 A | * | 12/1958 | Jones ............... 241/294 |
| 3,268,178 A | * | 8/1966 | Schoeppner ........... 241/189.1 |
| 5,271,440 A | * | 12/1993 | Bradstreet et al. ....... 144/176 |
| 5,320,292 A | * | 6/1994 | Smith ................ 241/191 |
| 5,904,193 A | * | 5/1999 | Kellner ............... 144/230 |

* cited by examiner

*Primary Examiner*—Faye Francis
(74) *Attorney, Agent, or Firm*—Rosenberg, Klein & Lee

(57) ABSTRACT

A cutting machine used for cutting elongate plastic materials into granules includes a cutting tool, which consists of a roller-shaped body, several knives, and soft metallic bars; the roller-shaped body has lengthwise extended holding trenches spaced on an outer side, and fitting trenches formed along lateral sides of the holding trenches; each knife has a lengthwise extending fitting trench on a lateral side thereof; the knives are fitted in respective ones of the holding trenches of the roller-shaped body with blades thereof projecting out; the soft metallic bars are fitted in respective ones of the holding trenches of the body and touching the corresponding knives; the soft metallic bars are pressed with such an external force as to change shape and project into the fitting trenches of the body as well as the fitting trenches of the knives, thus securing the knives to the body.

4 Claims, 6 Drawing Sheets

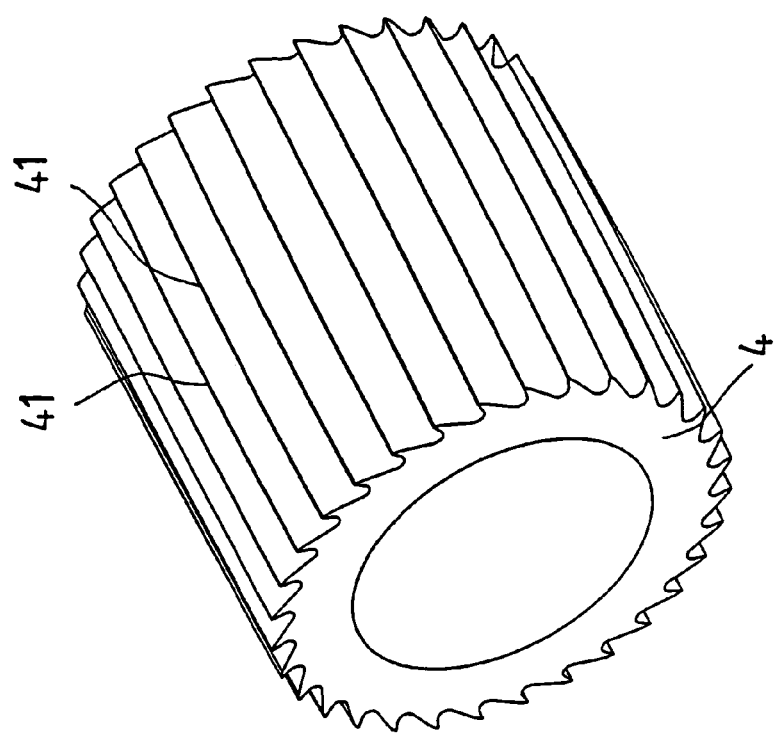
FIG. 6
PRIOR ART
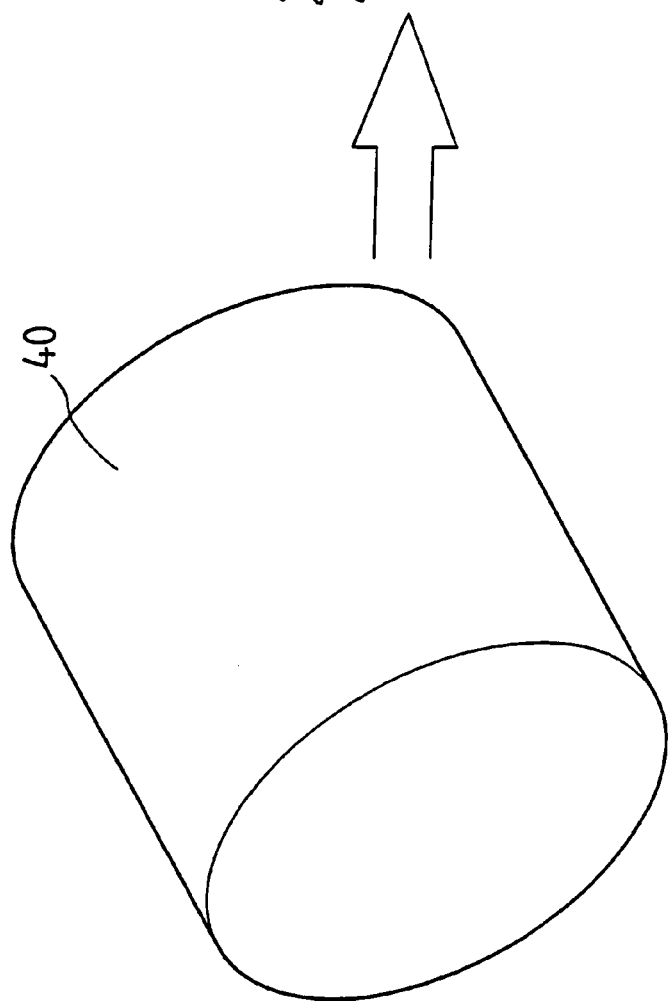

CUTTING TOOL OF A CUTTING MACHINE USED FOR CUTTING PLASTIC MATERIALS INTO GRANULES

BACKGROUND OF THE INVENTION

1. Field of the Invention

The present invention relates to a cutting tool of a cutting machine used for cutting elongate plastic materials into granules, more particularly one including several knives, which are lengthwise positioned and spaced apart on an outer side of a roller-shaped body, and which are connected with the roller-shaped body in such a way as to be capable of being replaced individually.

2. Brief Description of the Prior Art

Plastic materials used in injection molding are usually made into granules beforehand. And, elongate plastic bars are positioned together, and cut into granules for use as the materials in injection molding by means of a special cutting machine. Referring to FIG. 6, a conventional cutting tool 4 of a cutting tool used for serving the above purpose is substantially in the shape of a roller, and includes several blade portions 41 lengthwise extended and equidistantly spaced apart on a cylindrical body thereof. And, the cutting tool 4 is directly formed with the blade portions 41 by means of tooling a metallic cylinder 40 with a tooling machine therefore it consists of a single part.

The above cutting tool 4 is found to have disadvantages as followings:

1. The blade portions 41 are directly formed on a metallic cylinder by means of tooling therefore a whole cutting tool will be useless in case errs should happen to cause deformation of a blade portion of the cutting tool in manufacturing.
2. Even if only one of the blade portions 41 becomes blunt, breaks or cracks, the whole cutting tool has to be replaced with a new one because a new blade, which is connected to the cutting tool to replace a blunt or broken blade portion 41 by means of welding, won't be strong enough, and is prone to fall off to cause damage to other parts of the cutting machine. Therefore, the cutting tool isn't economical to use.

SUMMARY

It is a main object of the present invention to provide an improvement on a cutting tool of a cutting machine to overcome the above disadvantages.

The cutting tool of the present invention consists of a roller-shaped body, several knives, and soft metallic bars. The body has lengthwise extended holding trenches spaced on an outer side, and fitting trenches formed along lateral sides of the holding trenches. Each knife has a lengthwise extending fitting trench on a lateral side thereof. The knives are fitted in respective ones of the holding trenches of the roller-shaped body. The soft metallic bars are fitted in respective ones of the holding trenches of the body and touching the corresponding knives. The soft metallic bars are pressed with such an external force as to change shape and project into the fitting trenches of the body as well as the fitting trenches of the knives. Thus the knives are secured to the body, and can be easily removed for replacement.

BRIEF DESCRIPTION OF THE DRAWINGS

The present invention will be better understood by referring to the accompanying drawings, wherein:

FIG. 6 is a perspective view of the conventional cutting tool.

DETAILED DESCRIPTION OF THE PREFERRED EMBODIMENTS

Figure 1:
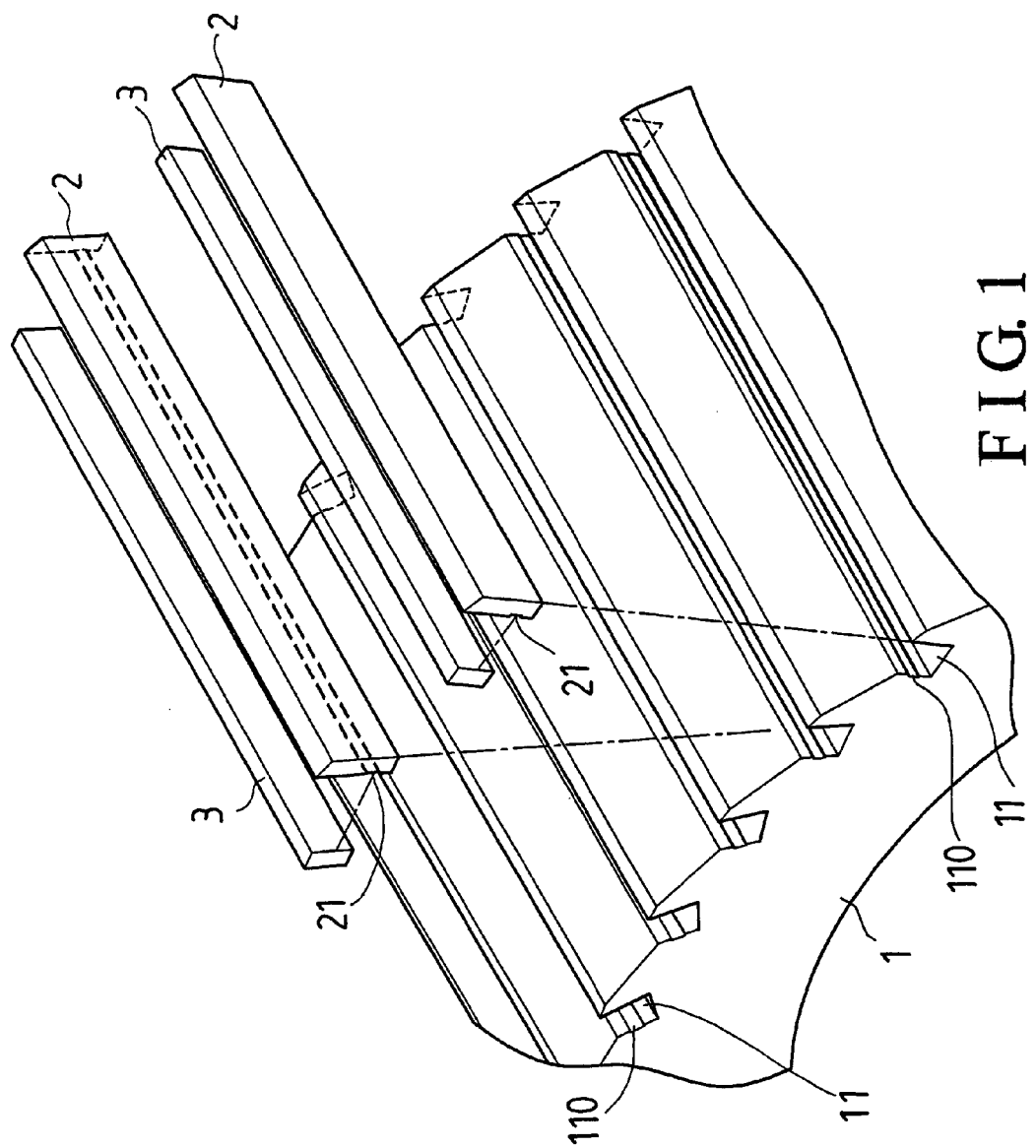
FIG. 1 is a partial exploded perspective view of the cutting tool according to the present invention.

Referring to FIG. 1, a preferred embodiment of a cutting tool of a cutting machine, which is used for cutting elongate plastic materials into granules, includes a main body 1, several knives 2, and elongate soft engaging bars 3.

The main body 1 is substantially in the shape of a roller with regular projections, and is formed with several holding trenches 11 on an outer side thereof by means of tooling machines, which holding trenches 11 are lengthwise extended and equidistantly spaced apart. Therefore, each of the holding trenches 11 has two opposing sides, and one lower side. Furthermore, a fitting trench 110 is formed along a first one of the opposing sides of each of the holding trenches 11.

The knives 2 and the elongate engaging bars 3 are substantially as long as the main body 1. And, the elongate soft engaging bars 3 are made of soft metal, e.g. copper, aluminum, and lead. Furthermore, each of the knives 2 is formed with a lengthwise extending fitting trench 21 on a lateral side thereof.

Figure 2:
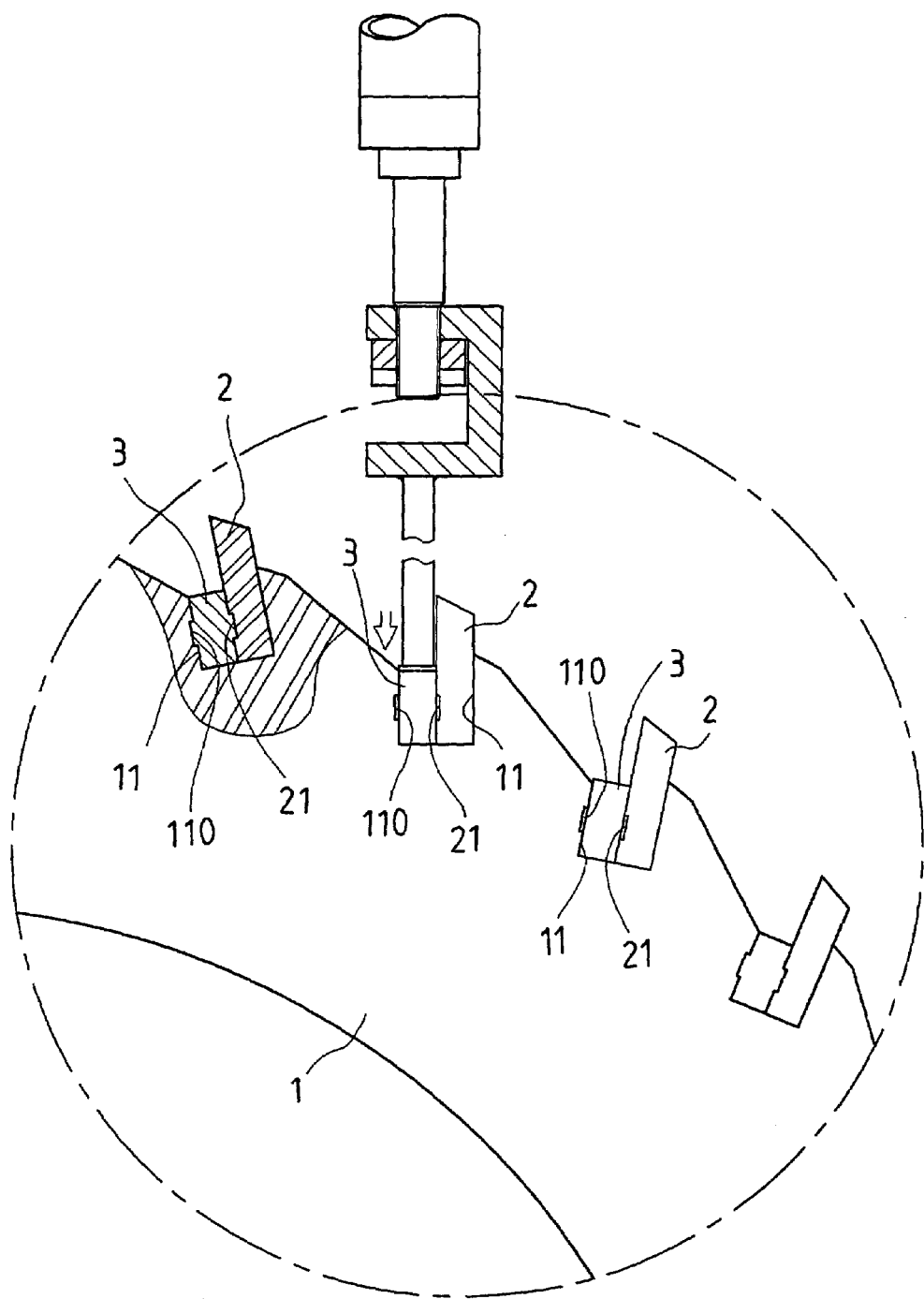
FIG. 2 is a partial side view of the cutting tool of the present invention under assembly.
Figure 3:
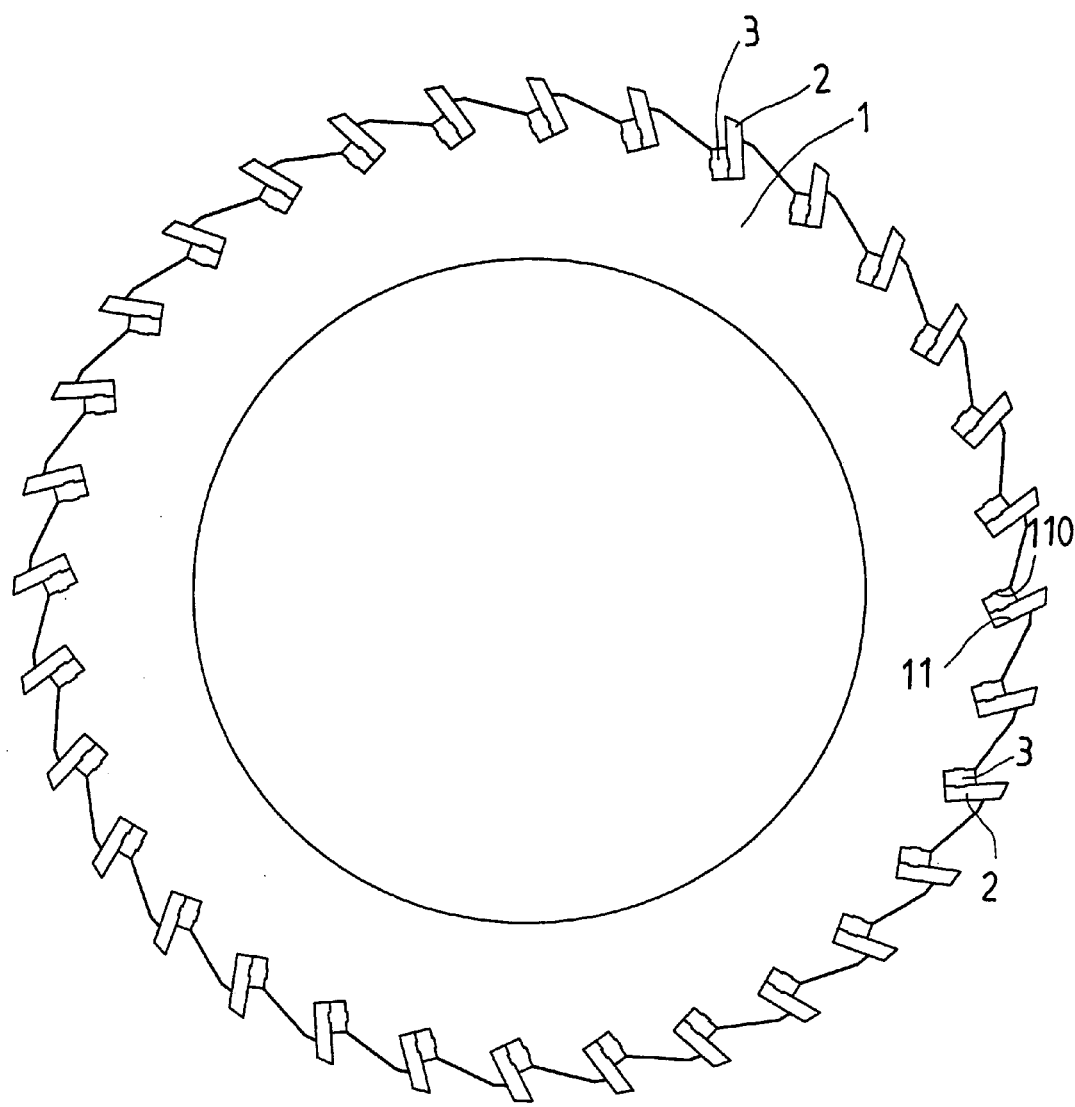
FIG. 3 is a side view of the cutting tool of the present invention.

To assemble the cutting tool, referring to FIGS. 2 and 3, each of the knives 2 is fitted in a respective one of the holding trenches 11 of the main body 1 with a blade part thereof facing outwards, and with the fitting trench 21 thereof being apart from and faced with the corresponding fitting trench 110 of the main body 1. And, each of the elongate engaging bars 3 is also fitted in a respective one of the holding trenches 11 to be next to a corresponding knife 2. And, the soft elongate metallic engaging bars 3 are pressed with large external force such that lateral portions thereof change shape and project into the fitting trenches 110 of the main body 1 as well as the fitting trenches 21 of the knives 2. Consequently, the soft elongate metallic engaging bars 3 engage both the main body 1 and the corresponding knives 2, and the knives 2 are securely connected to the main body 1. After the cutting tool is assembled, it is fitted on a cutting machine used for cutting elongate plastic materials into granules.

Figure 4:
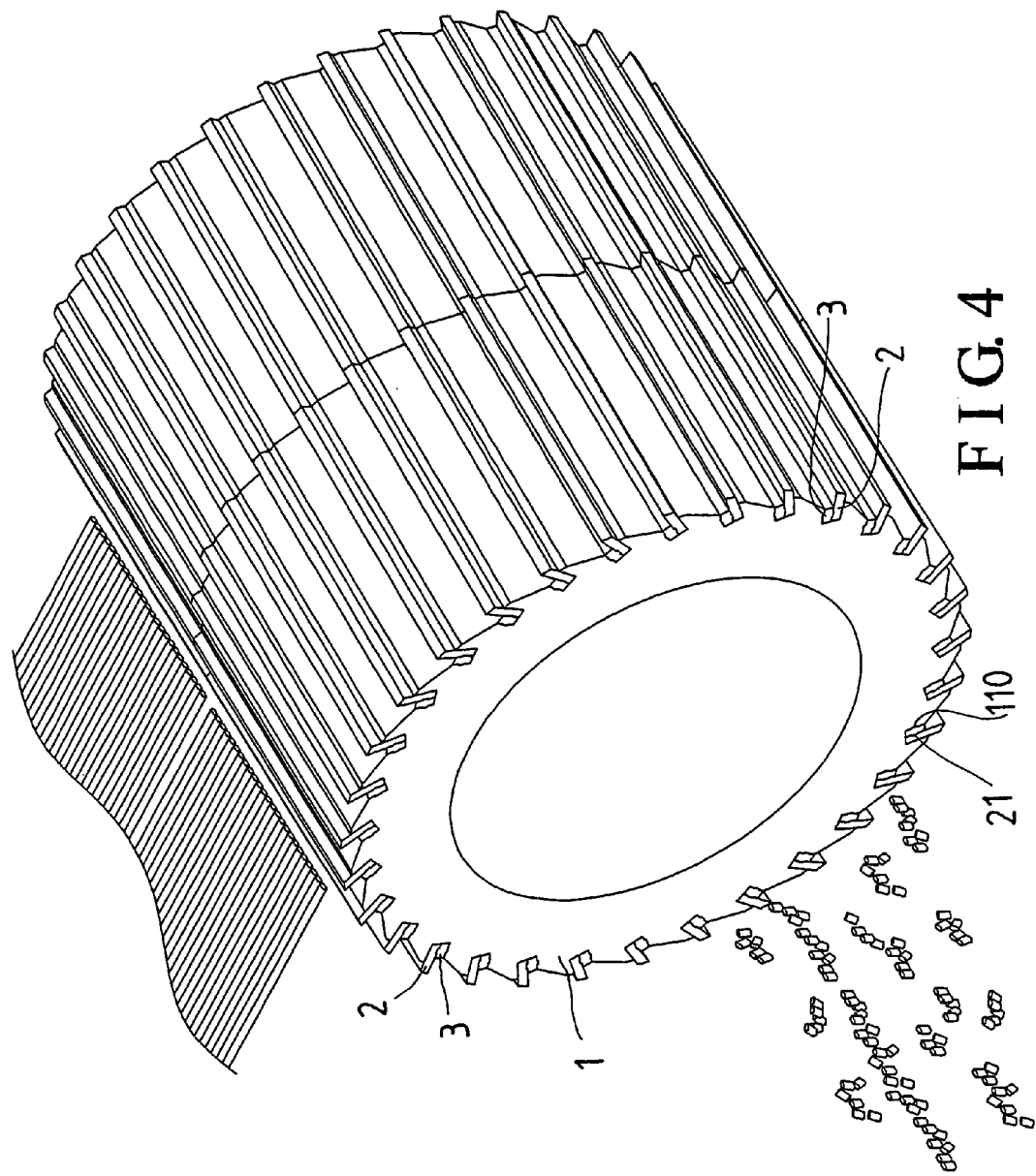
FIG. 4 is a view showing the purpose of the cutting tool of the present invention.

Referring to FIG. 4, elongate plastic materials are positioned side by side and close to the cutting tool of the present invention; thus, the elongate plastic materials will be cut into granules when the cutting tool rotates. And, a cutting machine can be equipped with several cutting tools of the above structure, which are positioned side by side as shown in FIG. 4.

Figure 5:
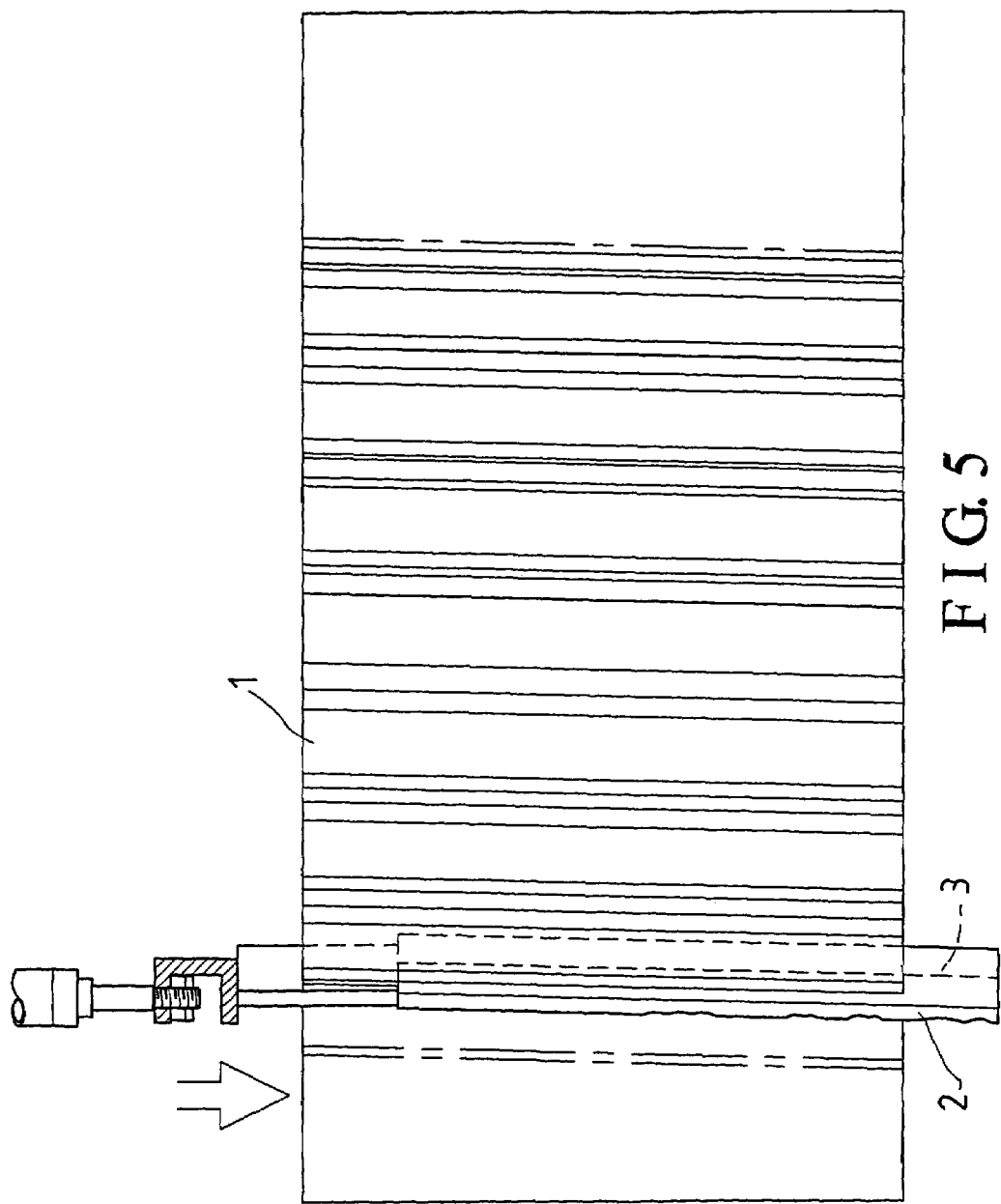
FIG. 5 is a partial top view of the cutting tool of the present invention with one knife being removed from it.

When the blade parts of the knives 2 become blunt or the knives 2 break or crack, the knives 2 can be removed and replaced with new ones. Therefore, in case a certain one of the knives 2 is faulty, it can be replaced alone. Referring to FIG. 5, to remove a knife 2 from the main body 1, first an elongate engaging bar 3 adjacent to the knife 2 is forced to project from one end of the main body 1 by means of exerting force on one end of the elongate bar 3, and moved away from the holding trench 11. Thus, the knife 2 can be easily removed from the main body 1, and a new knife can be fitted to the holding trench 11 in the way described above.

From the above description, it can be easily understood that the cutting tool of the present invention has advantages as followings:

3. The knives 2 of the cutting tool are fitted in the holding trenches of the main body, and they will be secured in position with soft elongate metallic engaging bars 3 after the soft elongate bars 3 are pressed with large external force so as to project into the fitting trenches of the main body and the knives. Therefore, the cutting tool is relatively easy to manufacture and assemble.
4. When a certain knife 2 becomes blunt, breaks or cracks, it can be easily removed for replacement after the corresponding elongate soft metallic bar 3 is forced to move out of the holding trench 11.
5. Because the knife 2 can be separately replaced with new ones after they become blunt, break or crack, the cutting tool is more economical to use than the conventional one in the Background whose whole has to be replaced even if only one of the blade parts is faulty because the blades thereof can't be replaced individually.

What is claimed is:

1. A cutting tool of a cutting machine used for cutting elongate plastic materials into granules, comprising a main body in a shape of a roller; the main body being formed with a plurality of lengthwise extended and spaced apart holding trenches on an outer side thereof; a fitting trench being formed along one of two opposing sides of each of the holding trenches;

a plurality of knives; each of the knives having a lengthwise extending fitting trench on a lateral side thereof; the knives being fitted in respective ones of the holding trenches of the main body with the fitting trenches thereof being apart from and faced with corresponding fitting trenches of the main body; and a plurality of elongate soft metallic engaging bars fitted in respective ones of the holding trenches of the main body and touching respective ones of the knives; the elongate soft metallic engaging bars being pressed with such an external force as to change shape and project into the fitting trenches of the main body as well as the fitting trenches of the knives, thus securing the knives to the main body.

2. The cutting tool as claimed in claim 1, wherein the elongate soft metallic engaging bars are made of copper.

3. The cutting tool as claimed in claim 1, wherein the elongate soft metallic engaging bars are made of aluminum.

4. The cutting tool as claimed in claim 1, wherein the elongate soft metallic engaging bars are made of lead.

* * * * *